3,036,923
PRESERVATION OF FISH
John H. Mahon, Scott Township, Allegheny County, Pa., assignor to Hagan Chemicals & Controls, Inc., Pittsburgh, Pa.
No Drawing. Filed July 11, 1960, Ser. No. 41,746
3 Claims. (Cl. 99—195)

This invention relates to preserving fish. More particularly, it relates to inhibiting the loss of moisture, soluble protein, minerals, and vitamins of frozen fish on thawing and cooking.

An extremely difficult problem in the fish industry has been the fact that frozen fish is subject to large moisture losses on thawing and again on cooking. The lost moisture, known as "thawing drip," carries with it a large portion of the soluble protein, minerals, and other nutrients.

The amount of moisture loss on thawing may be as high as 20% of the fish weight following prolonged frozen storage and as high as 14% after only one month of frozen storage. After cooking a portion of frozen fish in a closed vessel, the housewife frequently finds a tough, fibrous, concentrated portion of fish surrounded by a pool of liquid containing soluble protein, minerals and vitamins. Where the fish are fried or baked, the exuded fluid may be evaporated, leaving the soluble nutrients as a dried film on the cooking vessel. Because of the loss of the fluid, the cooked fish is dry, fibrous, devoid of much of its natural tenderness and flavor, and, of course, less nutritious.

My invention is concerned with minimizing the moisture and nutrient loss on thawing and cooking without particular regard to its cause. The exact mechanism by which my invention produces its remarkable results is not known. I have found that the sodium and potassium molecularly dehydrated phosphates having a molar ratio of alkali metal oxide to $P_2O_5$ of about 1 to 1 to about 2 to 1 will significantly reduce thawing drip without any undesirable side effects. Throughout the specification when I refer to the "molecularly dehydrated phosphates," I mean to include both crystalline and glassy forms within the specified range of ratios of alkali metal oxide to $P_2O_5$.

It is a common practice in the fish industry to dip scaled and filleted or skinned and filleted fish in a sodium chloride brine prior to freezing. It is thought that dipping the fish in a sodium chloride brine reduces the moisture loss on thawing, enhances the palatability of the fish, deters the growth of bacteria, and reduces the thawing drip following frozen storage. However, the primary reason for the brine dip or wash is to remove particles of scale and slimy material from the fillets. The process may have evolved from the custom of washing fish in ocean water.

There are several distinct disadvantages to the use of salt alone. For example, salt is well-known as a pro-oxidant. In fish, this characteristic may contribute to an undesirable yellow color and the peculiar flavor of rancidity. Fish treated with relatively high levels of salt exhibit an elevated thiobarbituric acid value (a chemical indication of rancidity) following a few weeks frozen storage. Dipping the fish in brine, of course, results in fish with a higher sodium chloride content than would otherwise be the case. Since foods with high sodium content are undesirable for persons suffering from heart or kidney ailments, such fish is shunned by hospitals and other institutional consumers normally interested in fish for its economy and nutrition.

As my figures will show, dipping fish in salt alone does not significantly reduce the thawing drip unless very high salt concentrations are used. High salt dips are not desirable because they cause rapid color and flavor changes including rancidity. I have found that the use of certain molecularly dehydrated phosphates alone or together with salt will result in a tastier, juicier fish with a more appetizing appearance. Moreover, fish treated according to my invention have a significantly reduced thawing drip, reduced tendency to turn yellow and are less susceptible to the development of rancidity. No ammonia is produced upon cooking fish treated according to my invention.

Several tables are presented herewith to illustrate the remarkable effectiveness of my invention. In each of the tables, unless otherwise stated, the fish fillets used were air expressed from Boston to Pittsburgh under continual refrigeration. After dipping in the specified solution held at 40° F., the fish in each case, unless otherwise stated elsewhere in the specification, were allowed to drain thoroughly, weighed, sealed in polyethylene bags and frozen at 0° F.

TABLE I

*Effect of Sodium and Potassium Polyphosphates on Thawing Drip of Haddock*

FILLETS FROZEN AT 0° F. FOR 35 DAYS

| Dip Solutions Containing No Salt | Dip Uptake, percent | Fish, pH | Phosphate Pickup, percent | Thawing Drip, percent |
|---|---|---|---|---|
| 5% $(NaPO_3)_6$[1] | 2.5 | 6.6 | 0.12 | 3.4 |
| 10% $(NaPO_3)_6$[1] | 1.9 | 6.6 | 0.17 | 3.1 |
| 20% $(NaPO_3)_6$[1] | 1.4 | 6.5 | 0.27 | 3.2 |
| 30% $(NaPO_3)_6$[1] | 2.7 | 6.5 | 0.52 | 3.3 |
| 40% $(NaPO_3)_6$[1] | 1.9 | 6.5 | 0.72 | 1.6 |
| 50% $(NaPO_3)_6$[1] | 1.9 | 6.5 | 0.66 | 2.2 |
| 5% $K_5P_3O_{10}$ | 4.3 | 6.7 | 0.11 | 5.5 |
| 10% $K_5P_3O_{10}$ | 1.5 | 6.8 | 0.06 | 2.4 |
| 20% $K_5P_3O_{10}$ | 1.8 | 6.8 | 0.33 | 2.4 |
| 30% $K_5P_3O_{10}$ | 1.8 | 6.8 | 0.39 | 0.6 |
| 40% $K_5P_3O_{10}$ | 2.7 | 6.9 | 0.94 | 1.2 |
| 50% $K_5P_3O_{10}$ | 3.1 | 6.9 | 0.87 | 1.7 |
| 2.5% $Na_5P_3O_{10}$ | 3.0 | 6.7 | 0.00 | 5.3 |
| 5.0% $Na_5P_3O_{10}$ | 2.1 | 6.7 | 0.12 | 4.1 |
| 7.5% $Na_5P_3O_{10}$ | 4.4 | 6.8 | 0.40 | 1.6 |
| 10.0% $Na_5P_3O_{10}$ | 1.5 | 6.5 | 0.21 | 3.0 |
| 12.5% $Na_5P_3O_{10}$ | 2.8 | 6.8 | 0.19 | 1.8 |
| 2.5% $K_5P_3O_{10}$ | 1.5 | 6.5 | 0.05 | 4.3 |
| 5.0% $K_5P_3O_{10}$ | 1.6 | 6.5 | 0.08 | 6.7 |
| 7.5% $K_5P_3O_{10}$ | 3.7 | 6.5 | 0.06 | 3.9 |
| 10.0% $K_5P_3O_{10}$ | 1.1 | 6.6 | 0.00 | 3.5 |
| 12.5% $K_5P_3O_{10}$ | 4.1 | 6.8 | 0.55 | 1.8 |
| 4% $K_4P_2O_7$ | 2.3 | 6.8 | 0.19 | 3.3 |
| 8% $K_4P_2O_7$ | 2.3 | 6.8 | 0.14 | 4.8 |
| 12% $K_4P_2O_7$ | 1.8 | 6.9 | 0.32 | 2.0 |
| 16% $K_4P_2O_7$ | 1.2 | 7.0 | 0.30 | 2.2 |
| 20% $K_4P_2O_7$ | 0.6 | 6.9 | 0.39 | 1.6 |
| 4% $Na_4P_2O_7$ | 4.4 | 6.8 | 0.23 | 5.9 |
| 5% Na Phosphate Glass | 2.3 | 6.8 | 0.15 | 3.2 |
| 10% (60% $P_2O_5$) | 3.4 | 6.7 | 0.32 | 2.7 |
| 5% Na Phosphate Glass | 2.8 | 6.6 | 0.14 | 7.0 |
| 10% (64% $P_2O_5$) | 2.7 | 6.6 | 0.34 | 2.5 |
| 5% Na Phosphate Glass | 2.2 | 6.6 | 0.14 | 4.6 |
| 10% (67% $P_2O_5$) | 2.5 | 6.6 | 0.20 | 3.2 |
| Control Samples (6) Dipped in Water Only | 1.4–2.6 | 6.5–6.7 | | 3.7–7.9 |
| 5% NaCl | 4.1 | 6.5 | | 8.6 |
| 10% NaCl | 3.3 | 6.5 | | 4.1 |
| 20% NaCl | 2.3 | 6.5 | | 2.1 |
| 30% NaCl | 6.0 | 6.5 | | 5.8 |
| 30% NaCl | 4.5 | 6.4 | | 2.6 |

[1] Wherever this formula appears in the specification, it is to mean a commercial glassy phosphate having a molar ratio of $Na_2O$ to $P_2O_5$ of about 1 to 1, commonly known as sodium hexametaphosphate.

Throughout the specification, "thawing drip" is the weight of fluid lost on thawing calculated as a percentage of the weight immediately before freezing; that is, the weight after being dipped and drained. "Phosphate pickup" or "added phosphate" represents the amount of the particular phosphate added to the fish by the dip. This is computed by subtracting the natural $P_2O_5$ content of the fish from the total $P_2O_5$ content and multiplying the result by the appropriate factor depending on the phosphate used. "Dip gain" is the percentage of weight increase during dip based on the weight of the fish before being dipped. Of course, each set of results was obtained on a different batch of fish. Slight variations in results throughout the specification may be caused by variations in the composition of the fish flesh depending on the month of the year in which they were caught as well as other factors including the type of fish.

Table I presents results obtained by dipping the fish fillets for two minutes in various dip solutions of my invention.

The test results presented in Table II clearly demonstrate that the molecularly dehydrated phosphates act synergistically with salt and are far superior to the use of salt alone. Tables I and II show that the best additive to the brine solution is sodium tripolyphosphate in a concentration of about 12.5%.

In Table II low concentrations of pyrophosphate had to be used because of solubility limitations at 40° F. in the presence of 4% NaCl. This table provides five samples treated with a 4% salt solution alone; it should be noted that the thawing drip ranged from 5.7% to 7.2% in these controls. In other words, salt alone produces little or no reduction of thawing drip. This result is in line with the controls using 4% salt throughout this specification. All fillets were dipped for two minutes and drained for 30 seconds before freezing.

| Dip Solutions Containing 4% Salt | Dip Uptake, Percent | Fish, pH | Phosphate Pickup, Percent | Thawing Drip Percent |
|---|---|---|---|---|
| 4% salt control | 3.7 | 6.6 | Nil | 2.2 |
| 0% $Na_5P_3O_{10}$+20% $(NaPO_3)_6$ | 2.3 | 6.6 | 0.29 | 7.7 |
| 2.5% $Na_5P_3O_{10}$+20% $(NaPO_3)_6$ | 2.8 | 6.7 | 0.31 | 5.4 |
| 5.0% $Na_5P_3O_{10}$+20% $(NaPO_3)_6$ | 2.0 | 6.7 | 0.38 | 5.5 |
| 7.5% $Na_5P_3O_{10}$+20% $(NaPO_3)_6$ | 2.5 | 6.8 | 0.43 | 3.1 |
| 10.0% $Na_5P_3O_{10}$+20% $(NaPO_3)_6$ | 2.1 | 6.7 | 0.41 | 2.1 |
| 12.5% $Na_5P_3O_{10}$+20% $(NaPO_3)_6$ | 2.2 | 6.8 | 0.31 | 1.5 |
| 12.5% $Na_5P_3O_{10}$ | 3.7 | 6.8 | 0.33 | 1.0 |
| 1.5% $Na_4P_2O_7$ | 2.7 | 6.6 | 0.05 | 6.6 |
| 2.0% $Na_4P_2O_7$ | 2.1 | 6.7 | 0.10 | 3.1 |
| 4% salt control | 2.8 | 6.7 | Nil | 6.2 |

Table III demonstrates that separate solutions of sodium chloride and molecularly dehydrated phosphates may be used if desired. All fillets were dipped in 40° F. solutions, drained for 30 seconds and frozen at 0° F. for 43 days. It is interesting to note that exposure to salt solution alone actually increased the thawing drip. My invention clearly eliminates this problem. It also clearly inhibits the development of high thiobarbituric acid values and the accompanying rancidity which develop when salt alone is used.

TABLE III

*Effect of Salt and Sodium Tripolyphosphate on Thawing Drip of Haddock*

FILLETS FROZEN AT 0° F. FOR 43 DAYS

| No. | Dip Solution No. 1 | Dip Solution No. 2 | Dip Time, minutes | Dip Uptake, percent | Fish, pH | Thawing Drip, percent | Added Phosphate, percent | TBA |
|---|---|---|---|---|---|---|---|---|
| 1 | Water | | 4 | 2.4 | 6.6 | 5.3 | | 0.27 |
| 2 | do | | 2 | 2.5 | 6.5 | 6.3 | | 0.21 |
| 3 | do | | 1 | 1.6 | 6.6 | 5.1 | | 0.26 |
| 4 | 4% NaCl | | 4 | 5.5 | 6.5 | 10.3 | | 0.18 |
| 5 | 4% NaCl | | 2 | 5.2 | 6.5 | 8.7 | | 0.26 |
| 6 | 4% NaCl | | 1 | 3.5 | 6.6 | 7.3 | | 0.32 |
| 7 | 12.5% $Na_5P_3O_{10}$ | | 4 | 5.3 | 6.8 | 2.3 | 0.59 | 0.19 |
| 8 | 12.5% $Na_5P_3O_{10}$ | | 2 | 1.9 | 6.7 | 2.7 | 0.30 | 0.14 |
| 9 | 12.5% $Na_5P_3O_{10}$ | | 1 | 2.1 | 6.7 | 5.1 | 0.12 | 0.11 |
| 10 | Water | 12.5% $Na_5P_3O_{10}$ | 2+2 | 4.8 | 6.8 | 1.8 | 0.44 | 0.24 |
| 11 | do | 12.5% $Na_5P_3O_{10}$ | 1+2 | 5.5 | 6.8 | 4.1 | 0.37 | 0.12 |
| 12 | do | 12.5% $Na_5P_3O_{10}$ | ½+2 | 6.2 | 6.9 | 2.6 | 0.33 | 0.18 |
| 13 | 4% NaCl | 12.5% $Na_5P_3O_{10}$ | 2+2 | 3.2 | 6.7 | 2.2 | 0.25 | 0.35 |
| 14 | 4% NaCl | 12.5% $Na_5P_3O_{10}$ | 1+2 | 6.0 | 6.7 | 2.9 | 0.45 | 0.19 |
| 15 | 4% NaCl | 12.5% $Na_5P_3O_{10}$ | ½+2 | 6.1 | 6.7 | 2.6 | 0.41 | 0.11 |

TABLE II

*Effect of Various Polyphosphates and Polyphosphate Mixtures on the Thawing Drip of Haddock*

FILLETS FROZEN AT 0° F. FOR 34 DAYS

| All Dip Solutions Containing 4% Salt | Dip Uptake, Percent | Fish, pH | Phosphate Pickup, Percent | Thawing Drip, Percent |
|---|---|---|---|---|
| 5% $(NaPO_3)_6$ | 2.4 | 6.7 | 0.09 | 3.5 |
| 10% $(NaPO_3)_6$ | 3.0 | 6.7 | 0.21 | 3.6 |
| 20% $(NaPO_3)_6$ | 2.2 | 6.7 | 0.31 | 0.9 |
| 30% $(NaPO_3)_6$ | 2.0 | 6.6 | 0.37 | 0.9 |
| 40% $(NaPO_3)_6$ | 2.9 | 6.6 | 0.55 | 0.7 |
| 50% $(NaPO_3)_6$ | 3.2 | 6.5 | 0.78 | 1.7 |
| 4% salt control | 3.0 | 6.8 | Nil | 5.7 |
| 2.5% $Na_5P_3O_{10}$ | 2.9 | 6.8 | 0.10 | 5.1 |
| 5.0% $Na_5P_3O_{10}$ | 2.0 | 6.8 | 0.13 | 3.4 |
| 7.5% $Na_5P_3O_{10}$ | 2.9 | 6.8 | 0.13 | 1.7 |
| 10.0% $Na_5P_3O_{10}$ | 1.7 | 6.9 | 0.20 | 2.3 |
| 12.5% $Na_5P_3O_{10}$ | 1.2 | 6.8 | 0.28 | 0.3 |
| 4% salt control | 3.0 | 6.7 | Nil | 7.1 |
| 0% $Na_5P_3O_{10}$+5% $(NaPO_3)_6$ | 1.7 | 6.7 | 0.07 | 3.9 |
| 2.5% $Na_5P_3O_{10}$+5% $(NaPO_3)_6$ | 3.7 | 6.7 | 0.31 | 4.0 |
| 5.0% $Na_5P_3O_{10}$+5% $(NaPO_3)_6$ | 3.0 | 6.8 | 0.33 | 2.7 |
| 7.5% $Na_5P_3O_{10}$+5% $(NaPO_3)_6$ | 2.5 | 6.8 | 0.27 | 1.8 |
| 10.0% $Na_5P_3O_{10}$+5% $(NaPO_3)_6$ | 2.2 | 6.9 | 0.35 | 1.2 |
| 12.5% $Na_5P_3O_{10}$+5% $(NaPO_3)_6$ | 2.0 | 6.9 | 0.27 | 2.4 |
| 12.5% $Na_5P_3O_{10}$ | 2.7 | 6.8 | 0.35 | 1.7 |
| 4% salt control | 4.0 | 6.6 | Nil | 6.5 |
| 0% $Na_5P_3O_{10}$+10% $(NaPO_3)_6$ | 3.9 | 6.7 | 0.22 | 3.8 |
| 2.5% $Na_5P_3O_{10}$+10% $(NaPO_3)_6$ | 2.0 | 6.7 | 0.29 | 3.6 |
| 5.0% $Na_5P_3O_{10}$+10% $(NaPO_3)_6$ | 2.1 | 6.7 | 0.29 | 1.9 |
| 7.5% $Na_5P_3O_{10}$+10% $(NaPO_3)_6$ | 2.7 | 6.8 | 0.33 | 2.1 |
| 10.0% $Na_5P_3O_{10}$+10% $(NaPO_3)_6$ | 2.6 | 6.7 | 0.48 | 2.6 |
| 12.5% $Na_5P_3O_{10}$+10% $(NaPO_3)_6$ | 1.3 | 6.8 | 0.18 | 1.6 |
| 12.5% $Na_5P_3O_{10}$ | 1.8 | 6.8 | 0.19 | 1.5 |

Table IV demonstrates that my invention is quite effective in reducing thawing drip over long periods of frozen storage. The duration of each dip was two minutes. In this test, the fillets were drained for 15 seconds, sealed in polyethylene bags and held at 0° F. It is well to note that the 4% salt controls exhibited the greatest thawing drip in each case.

TABLE IV

*Effect of Polyphosphate Salt Dips and Duration of Frozen Storage on Thawing Drip of Haddock*

FILLETS FROZEN AND STORED AT 0° F.

| All Dip Solutions Contain 4% Salt | 7 Days, percent | 18 Days, percent | 39 Days, percent | 85 Days, percent |
|---|---|---|---|---|
| 12.5% $Na_5P_3O_{10}$[1] | 1.3 | 0.9 | 1.2 | 2.1 |
| 10% Na 60% $P_2O_5$ glass | 1.4 | 2.1 | 1.5 | 2.0 |
| 20% Na 60% $P_2O_5$ glass | 1.3 | 0.9 | 1.3 | 1.4 |
| % Na 60% $P_2O_5$ glass | 1.2 | 0.9 | 1.6 | 1.3 |
| Control—4% salt alone | 7.8 | 8.1 | 9.4 | 8.5 |
| 30% $(NaPO_3)_6$ | 2.6 | 1.3 | 4.3 | 2.3 |
| 10% Na trimetaphosphate | 3.1 | 3.4 | 4.2 | 9.0 |
| 15% Na trimetaphosphate[1] | 3.5 | 2.0 | 3.3 | 5.7 |
| 10% Na tetrametaphosphate[1] | 3.4 | 6.0 | 8.5 | 7.2 |
| Control (4% salt) | 5.8 | 8.2 | 11.6 | 9.5 |

[1] Effective saturation with 4% salt at 40° F.

In Table V is shown the effect on thawing drip of combining sodium or potassium polyphosphates with KCl as compared to NaCl.

TABLE V

*Effect of Sodium or Potassium Polyphosphates ±NaCl or KCl on Thawing Drip From Haddock Fillets*

HELD AT 0° F. FOR 33 DAYS

| Dip Used | Thawing Drip, percent | Fish, pH |
|---|---|---|
| Water-Control | 6.3 | 6.6 |
| 4% NaCl | 5.7 | 6.7 |
| 4% KCl | 4.2 | 6.5 |
| 12.5% $Na_5P_3O_{10}$ | 1.4 | 6.9 |
| 12.5% $Na_5P_3O_{10}$+4% NaCl | 1.2 | 6.8 |
| 12.5% $Na_5P_3O_{10}$+4% KCl | 1.0 | 6.8 |
| 12.5% $K_5P_3O_{10}$ | 1.7 | 6.7 |
| 12.5% $K_5P_3O_{10}$+4% NaCl | 0.9 | 6.7 |
| 12.5% $K_5P_3O_{10}$+4% KCl | 1.1 | 6.8 |
| 30% $(NaPO_3)_6$ | 2.1 | 6.7 |
| 30% $(NaPO_3)_6$+4% NaCl | 2.0 | 6.7 |
| 30% $(NaPO_3)_6$+4% KCl | 2.2 | 6.6 |

These results suggest that sodium and potassium salts are equally effective. However, solubility limitations under various conditions may affect the choice of polyphosphate in practical application. Potassium metaphosphate, for example, which is normally relatively insoluble, may be used when solubilized by the known method of dissolving it in the presence of a sodium salt. It may be used in my invention by dissolving it first in a 1% solution of sodium chloride, for example, and using the mixture as the only dip or as the first of two dips, the second containing a higher concentration of sodium chloride.

Throughout the specification, including the claims, it is to be understood that the term molecularly dehydrated phophates (or polyphosphates) having a molar ratio of sodium, potassium, or alkali metal oxide to $P_2O_5$ of from about 1 to 1 to about 2 to 1 means any sodium or potassium salt of a polyphosphoric acid through the range from $HPO_3(H_2O:P_2O_5)$ to $H_4P_2O_7(2H_2O:P_2O_5)$, including only partially substituted compounds, such as sodium acid pyrophosphate, for example, having the formula $Na_2H_2P_2O_7$. In other words, I may employ, and mean to include in the term "molecularly dehydrated phosphate having a molar ratio of $M_2O$ to $P_2O_5$ of from about 1 to 1 to about 2 to 1" and similar terms appearing herein, any sodium or potassium salt, fully or only partially substituted, of a polyphosphoric acid having a ratio of $H_2O$ to $P_2O_5$ of from about 1 to 1 to about 2 to 1.

While I have shown and described certain present preferred embodiments of the invention and have illustrated certain present preferred methods of practicing the same, it is to be distinctly understood that the invention is not limited thereto but may be otherwise variously embodied and practiced within the scope of the following claims.

I claim:

1. The method of inhibiting the loss of moisture, soluble protein, minerals and vitamins of frozen fish flesh on thawing and cooking comprising contacting said fish flesh with a solution of a compound selected from the group consisting of sodium and potassium salts of molecularly dehydrated phosphoric acids having a molar ratio of $H_2O$ to $P_2O_5$ of from about 1 to 1 to about 2 to 1, and freezing said fish flesh.

2. The method of inhibiting the loss of moisture, soluble protein, minerals and vitamins of frozen fish flesh on thawing and cooking comprising contacting said fish flesh prior to freezing with a solution of alkali metal chloride and a compound selected from the group consisting of sodium and potassium salts of molecularly dehydrated phosphoric acids having a molar ratio of $H_2O$ to $P_2O_5$ of from about 1 to 1 to about 2 to 1.

3. The method of inhibiting the loss of moisture, soluble protein, minerals and vitamins of frozen fish flesh on thawing and cooking comprising contacting said fish flesh prior to freezing with an aqueous solution of a compound selected from the group consisting of sodium and potassium salts of molecularly dehydrated phosphoric acids having a molar ratio of $H_2O$ to $P_2O_5$ of from about 1 to 1 to about 2 to 1.

References Cited in the file of this patent

UNITED STATES PATENTS

| | | |
|---|---|---|
| 2,176,764 | Gross | Oct. 17, 1939 |
| 2,222,087 | Parsons | Nov. 19, 1940 |
| 2,555,236 | Kreidl et al. | May 29, 1951 |
| 2,629,664 | Watts et al. | Feb. 24, 1953 |
| 2,735,777 | Meyer | Feb. 21, 1956 |